(12) United States Patent
Synnestvedt (10) Patent No.: US 8,967,327 B2
(45) Date of Patent: Mar. 3, 2015

(54) BAFFLE ASSEMBLY (71) Applicant: Zephyros, Inc., Romeo, MI (US)

(72) Inventor: Blake Synnestvedt, Birmingham, MI (US)

(73) Assignee: Zephyros, Inc., Romeo, MI (US)

( * ) Notice: Subject to any disclaimer, the term of this patent is extended or adjusted under 35 U.S.C. 154(b) by 0 days.

(21) Appl. No.: 13/796,250

(22) Filed: Mar. 12, 2013

(65) Prior Publication Data

US 2014/0138388 A1  May 22, 2014

Related U.S. Application Data (60) Provisional application No. 61/613,136, filed on Mar. 20, 2012.

(51) Int. Cl.
| | |
|---|---|
| *B65D 88/12* | (2006.01) |
| *E04B 1/82* | (2006.01) |
| *B65D 90/52* | (2006.01) |
| *B62D 29/00* | (2006.01) |

(52) U.S. Cl.
CPC .............. *B65D 90/52* (2013.01); *B62D 29/002* (2013.01)
USPC ............. 181/284; 220/563; 428/100; 425/4 R (58) Field of Classification Search
USPC ........ 220/562, 563; 249/63, 91, 96; 264/46.5, 264/46.6, 279, 252, 255, 54; 425/117, 145, 425/256, 382 N, 817 R, 4 R, 257, 382 R, 425/382.2, 462, 463, 110, 125, 127; 29/522.1; 428/99, 100, 122; 296/39.3, 296/187.02; 181/286, 293
See application file for complete search history.

(56) References Cited

U.S. PATENT DOCUMENTS

| 625,559 | A | | 5/1899 | Keeler |
|---|---|---|---|---|
| 4,751,249 | A | | 6/1988 | Wycech |
| 4,813,690 | A | | 3/1989 | Coburn, Jr. |
| 4,901,500 | A | | 2/1990 | Wycech |
| 5,266,133 | A | | 11/1993 | Hanley et al. |
| 5,358,397 | A | | 10/1994 | Ligon et al. |
| 5,506,025 | A | * | 4/1996 | Otto et al. ........................ 428/98 |
| 5,575,526 | A | | 11/1996 | Wycech |
| 5,678,826 | A | * | 10/1997 | Miller ........................... 277/316 |
| 5,708,042 | A | | 1/1998 | Hasegawa |

(Continued)

FOREIGN PATENT DOCUMENTS

| DE | 3838655 A1 | 5/1990 |
|---|---|---|
| DE | 19856255 C1 | 3/1998 |

(Continued)

OTHER PUBLICATIONS

PCT Search Report & Written Opinion dated May 21, 2013; PCT/US2013/030457.
International Search Report & Written Opinion dated Mar. 14, 2012 For corresponding PCT Application No. US2011/063698 filed Dec. 7, 2011.

(Continued)

*Primary Examiner* — Steven A. Reynolds
*Assistant Examiner* — Javier A Pagan
(74) *Attorney, Agent, or Firm* — The Dobrusin Law Firm, PC (57) ABSTRACT

A device and method for a baffling, sealing, or reinforcement that includes one or more flow channel structures selectively formed in a carrier for achieving improved connection between the carrier and an expandable material attached thereto.

18 Claims, 2 Drawing Sheets

(56) References Cited

U.S. PATENT DOCUMENTS

| | | | |
|---|---|---|---|
| 5,755,486 A | 5/1998 | Wycech | |
| 5,766,719 A | 6/1998 | Rimkus | |
| 5,931,474 A | 8/1999 | Chang et al. | |
| 5,932,680 A | 8/1999 | Heider | |
| 6,068,922 A | 5/2000 | Vercesi et al. | |
| 6,131,897 A | 10/2000 | Barz et al. | |
| 6,146,565 A * | 11/2000 | Keller | 264/46.5 |
| 6,150,428 A | 11/2000 | Hanley et al. | |
| 6,199,940 B1 | 3/2001 | Hopton et al. | |
| 6,207,244 B1 | 3/2001 | Hesch | |
| 6,270,600 B1 | 8/2001 | Wycech | |
| 6,276,105 B1 | 8/2001 | Wycech | |
| 6,287,666 B1 | 9/2001 | Wycech | |
| 6,296,298 B1 | 10/2001 | Barz | |
| 6,368,438 B1 | 4/2002 | Chang | |
| 6,389,775 B1 | 5/2002 | Steiner | |
| 6,413,611 B1 * | 7/2002 | Roberts et al. | 428/99 |
| 6,422,575 B1 | 7/2002 | Czaplicki | |
| 6,455,146 B1 | 9/2002 | Fitzgerald | |
| 6,546,693 B2 | 4/2003 | Wycech | |
| 6,620,501 B1 | 9/2003 | Kassa | |
| 6,649,243 B2 | 11/2003 | Roberts et al. | |
| 6,706,772 B2 | 3/2004 | Czaplicki | |
| 6,786,533 B2 | 9/2004 | Bock | |
| 6,811,864 B2 | 11/2004 | Czaplicki | |
| 6,820,923 B1 * | 11/2004 | Bock | 296/187.02 |
| 6,846,559 B2 | 1/2005 | Czaplicki | |
| 6,920,693 B2 | 7/2005 | Hankins | |
| 6,926,784 B2 | 8/2005 | Bock | |
| 6,991,237 B2 | 1/2006 | Kassa | |
| 7,011,315 B2 | 3/2006 | Czaplicki | |
| 7,077,460 B2 | 7/2006 | Czaplicki | |
| 7,125,461 B2 | 10/2006 | Czaplicki et al. | |
| 7,169,467 B2 | 1/2007 | Wilson | |
| 7,199,165 B2 | 4/2007 | Kassa et al. | |
| 7,313,865 B2 | 1/2008 | Czaplicki et al. | |
| 7,913,814 B2 * | 3/2011 | Duffin et al. | 181/294 |
| 8,028,799 B2 | 10/2011 | Hasler | |
| 8,079,442 B2 | 12/2011 | Wojtowicki | |
| 8,087,916 B2 | 1/2012 | Kanie et al. | |
| 8,293,360 B2 | 10/2012 | Cousin et al. | |
| 8,388,037 B2 | 3/2013 | LaNore et al. | |
| 8,444,214 B2 | 5/2013 | Helferty | |
| 8,449,701 B2 * | 5/2013 | Allen et al. | 156/79 |
| 8,469,143 B2 | 6/2013 | Prunarety et al. | |
| 2003/0045620 A1 | 3/2003 | Carlson et al. | |
| 2004/0011282 A1 | 1/2004 | Myers et al. | |
| 2004/0076831 A1 | 4/2004 | Hable et al. | |
| 2005/0082111 A1 * | 4/2005 | Weber | 181/204 |
| 2005/0260399 A1 | 11/2005 | Finerman | |
| 2006/0020076 A1 | 1/2006 | Finerman | |
| 2006/0073266 A1 | 4/2006 | Myers et al. | |
| 2007/0138683 A1 | 6/2007 | Kanie | |
| 2007/0193171 A1 | 8/2007 | Finerman | |
| 2008/0110694 A1 | 5/2008 | Niezur | |
| 2009/0001758 A1 | 1/2009 | Hanley, IV et al. | |
| 2009/0111371 A1 | 4/2009 | Niezur et al. | |
| 2010/0021267 A1 | 1/2010 | Nitsche | |
| 2010/0253004 A1 | 10/2010 | Lehmann | |
| 2010/0320028 A1 | 12/2010 | Wojtowicki | |
| 2011/0057392 A1 * | 3/2011 | Monnet et al. | 277/312 |
| 2011/0063698 A1 | 3/2011 | Liu et al. | |
| 2011/0076435 A1 * | 3/2011 | Tachibana et al. | 428/43 |
| 2011/0109003 A1 | 5/2011 | LaNore et al. | |
| 2011/0189428 A1 | 8/2011 | Belpaire et al. | |
| 2011/0192675 A1 | 8/2011 | Lecroart et al. | |
| 2012/0207986 A1 | 8/2012 | Belpaire et al. | |
| 2012/0295093 A1 | 11/2012 | Belpaire et al. | |
| 2013/0087406 A1 | 4/2013 | Franey | |
| 2013/0140731 A1 | 6/2013 | Belpaire | |
| 2013/0181470 A1 | 7/2013 | LaNore et al. | |
| 2013/0328349 A1 * | 12/2013 | Lewis et al. | 296/187.02 |

FOREIGN PATENT DOCUMENTS

| | | |
|---|---|---|
| DE | 19648164 A1 | 5/1998 |
| DE | 19812288 C1 | 5/1999 |
| DE | 29904705 U1 | 6/1999 |
| DE | 19835704 A1 | 2/2000 |
| EP | 0383498 A2 | 8/1990 |
| EP | 0697956 B1 | 2/1996 |
| EP | 0730999 A1 | 9/1996 |
| EP | 0893332 A1 | 1/1999 |
| EP | 1122152 A2 | 8/2001 |
| EP | 1149679 A2 | 10/2001 |
| EP | 1435320 A2 | 7/2004 |
| EP | 1975006 | 10/2008 |
| EP | 1280658 B1 | 8/2009 |
| EP | 2097308 B1 | 9/2009 |
| EP | 2113447 | 11/2009 |
| EP | 2134799 A1 | 12/2009 |
| EP | 2236358 B1 | 6/2010 |
| EP | 2242634 A1 | 10/2010 |
| EP | 2176113 B1 | 4/2011 |
| EP | 2330019 A1 | 8/2011 |
| EP | 2360002 A1 | 8/2011 |
| EP | 2390077 A1 | 11/2011 |
| EP | 2507116 A1 | 10/2012 |
| EP | 2533961 A1 | 12/2012 |
| EP | 2576176 A1 | 4/2013 |
| EP | 1534561 B1 | 8/2013 |
| EP | 2262633 B1 | 9/2013 |
| GB | 903146 A | 8/1962 |
| JP | 9328568 A | 12/1997 |
| JP | 11-165598 A | 6/1999 |
| JP | 2002221968 A | 8/2002 |
| JP | 2002331960 A | 11/2002 |
| JP | 2002-347058 A | 12/2002 |
| JP | 2004-230834 A | 8/2004 |
| JP | 2006-123710 A | 5/2006 |
| WO | 95/25085 A1 | 9/1995 |
| WO | 97/02967 A1 | 1/1997 |
| WO | 98/36944 A1 | 8/1998 |
| WO | 98/50221 A1 | 11/1998 |
| WO | 99/08854 A1 | 2/1999 |
| WO | 00/43253 A | 7/2000 |
| WO | 00/46017 A1 | 8/2000 |
| WO | 01/19667 A1 | 3/2001 |
| WO | 01/54936 A1 | 8/2001 |
| WO | 01/83206 | 11/2001 |
| WO | 01/88033 A1 | 11/2001 |
| WO | 2005/077634 A2 | 8/2002 |
| WO | 03/089221 A1 | 10/2003 |
| WO | 2005/113689 A1 | 12/2005 |
| WO | 2008/065049 A1 | 6/2008 |
| WO | 2009/049886 A1 | 4/2009 |
| WO | 2009/053462 | 4/2009 |
| WO | 2009/117376 A1 | 9/2009 |
| WO | 2011/134943 A1 | 11/2011 |
| WO | 2011/147872 A1 | 12/2011 |
| WO | 2012/078729 A1 | 6/2012 |

OTHER PUBLICATIONS

Corresponding PCT Application No. US2011/063698 filed Dec. 7, 2011; Published as WO2012/078729A1 on Jun. 14, 2012.

Chinese Office Action dated Sep. 26, 2011, Application No. 200980109337.3.

Peter Born; Bernd Mayer Structural Bonding in Automotive Applications.

Gregory W. Hopton; Philip E. Weber; Leslie J. Osenkowski; Gerald J. Renaud; Application of a Structural Reinforcing Material to Improve Vehicle NVH Characteristics.

Kurt Lilley; Eric Seifferlein; Anita Zalobsky; Comparison of Preformed Acoustic Baffles and Two-Component Polyurethane Foams for Filing Body Cavities.

Kurt M. Lilley; Michael J. Frasse; Philip E. Weber; A Comparison of NVH Treatments for Vehicle Floorplan Applications.

Kurt M. Lilley; Phil E. Weber; Vehicle Acoustic Solutions.

PCT International Preliminary Report on Patentability dated Oct. 2, 2014 (Appln. No. PCT/US2013/030457).

* cited by examiner

BAFFLE ASSEMBLY

TECHNICAL FIELD

The present teachings relate generally to a baffling, sealing, or reinforcement member that includes one or more flow channel structures selectively formed in a carrier for achieving improved connection between the carrier and an expandable material attached thereto.

BACKGROUND

The transportation industry continues to require methods of baffling, reinforcement and sealing that provide improved functionality while simultaneously providing reduced weight and cost. Often, when attempting to reduce the weight of a part, the use of dissimilar materials in combination provides the requisite baffling, reinforcement, and/or sealing, while achieving an overall reduction in weight. As a result, numerous challenges arise from attempts to combine and attach dissimilar materials. In the event that such combinations of dissimilar materials are not properly secured to one another, the part may fail to fill a cavity as intended.

Existing methods for securing dissimilar materials to one another are taught in U.S. Pat. No. 6,131,897. The '897 patent teaches insertion of a strip of uncured thermally expandable material into a channel formed within a carrier. Additional methods are disclosed in U.S. Pat. No. 8,413,611 which teaches well-known post and tab structures extending from a support flange surrounding a marginal rim of a baffle structure. That patent also teaches the importance of avoiding any expandable material over an inner portion of its synthetic resin carrier. In this regard, the patent appears to deem it critical that the expandable band be continuously circumscribing. Many designs and structures for improving attachment between a carrier and second dissimilar material require complex tooling and geometries and further fail to effectively achieve the desired sound deadening, vibration damping or reinforcement. There is thus a need for improved means of securing dissimilar materials to one another, while utilizing simplified tooling and manufacturing processes. Further, according to the latter patent, the requirement of a continuous peripheral band and the avoidance of expandable material over the interior area forecloses any attachment techniques by which either coverage over an interior portion, an attachment of material to the carrier in the interior area, or both, is possible. This accordingly limits the utility of resulting parts. For example, a part having expandable material over an interior portion appears to be prevented by the teachings of U.S. Pat. No. 6,413,611. It is therefore desirable to make a part that allows at least partial coverage of an interior portion with an expandable material while also providing secure attachment of expandable material to the carrier.

SUMMARY OF THE INVENTION

The present teachings meet the above needs by providing a unique approach to the manufacture of parts that makes use of in situ attachment of expandable material to the carrier that also allows for enhanced functionality of the expandable material over a greater portion of the part. In a first aspect, the present teachings contemplate a baffle assembly for use in a cavity of a transportation vehicle, comprising a carrier including an inner portion that includes a first outward facing surface and at least one sloping channels defined in and recessed relative to the first surface. The carrier may include a peripheral portion that generally surrounds the inner portion and includes at least one outwardly projecting ledge; the inner portion and the peripheral portion being connected along at least one barrier wall that at least partially circumscribes the inner portion and which intersects with at least one of the sloping channels. The carrier may also include at least one finger member that is located within in the inner portion and projects outwardly from within at least one of the sloping channels at an angle between 0 and 180° relative to the outwardly projecting ledge. The baffle assembly may comprise a resinous material that includes a polymer that (i) is adapted for thermal expansion upon activation by heat that is located within at least one sloping channels, (ii) is located on at least a portion of the outwardly projecting ledge; and (iii) at least partially covers the at least one finger member and (iv) is retained on the carrier at least partially due to a mechanical connection with the at least one finger member.

The first surface of the inner portion may be generally flat. Alternatively, the first surface of the inner portion may include an undulating profile and/or may have a surface topography that varies along the surface. The outwardly projecting ledge may only partially circumscribe the at least one barrier wall. The baffle may be free of any projecting ledge that substantially circumscribes the peripheral portion. The at least one finger member may be oriented at an angle of approximately 90° relative to the first outward facing surface. The at least one finger may be configured as an elongated free-ended member that deforms in response to flow of the resinous material. The at least one finger member may project from a wall defining the sloping channel outwardly in a direction toward the first surface. The at least one finger member may have a hook shaped free end portion when at least partially covered by the resinous material. The resinous material may include a plurality of masses that are located on the outwardly projecting ledge and are intermittently spaced relative to each other. The resinous material may be such that it can be melted for injection molding at a first temperature, and thereafter be activated by heating at an activation temperature above the first temperature for causing it to expand. The carrier may include an integrated mechanical attachment device that projects away from the inner portion and is substantially juxtaposed with either or both of the inner portion or at least one of the sloping channels so that the attachment device can be located within a hole of a wall defining a cavity of a transportation vehicle, and the resinous material will be in opposing relation to the hole for filling the hole upon activation of the resinous material by exposure to a temperature above its activation temperature. The at least one finger member may have a generally circular cross-section, a generally rectangular cross-section, or some other geometric configuration. It may vary along its height in a manner that allows it to flex during flow of molten expandable material.

In a second aspect of the present teachings, there is contemplated a method of making a baffle assembly for use in a cavity of a transportation vehicle, comprising the steps of injection molding a carrier including an inner portion that includes a first surface and a plurality of sloping channels defined in the first surface. The carrier may also include a peripheral portion that generally surrounds the inner portion and includes at least one outwardly projecting ledge; the inner portion and the peripheral portion being connected along at least one wall that at least partially circumscribes the inner portion and which intersects with at least one of the sloping channels. The carrier may include at least one finger member that is located within in the inner portion and projects outwardly from within at least one of the sloping channels at an angle between 0 and 180° relative to the outwardly projecting ledge. The method of making the baffle assembly may comprise a step of injection molding onto the carrier a resinous material that includes a polymer that is adapted for thermal expansion upon activation by heat, by introducing the resinous material in a molten state via at least one gate in a mold so that the resinous material flows through the plurality of sloping channels, locates itself on at least a portion of the outwardly projecting ledge; and at least partially covers the at least one finger member. The method may also include a step of solidifying the resinous material so that it is retained on the carrier at least partially due to a mechanical connection with the at least one finger member, while retaining its ability to activate upon being subjected to heat in a paint bake curing oven during subsequent vehicle assembly operations.

The teachings herein contemplates a device and method for the sealing of cavities with a combination comprising a carrier and a resinous material, the carrier material having one or more sloping channels defined thereon and one or more finger members projecting outwardly from within at least one of the sloping channels. The baffle assembly disclosed herein may allow for effective baffling and/or sealing of a cavity with one or more dissimilar materials more effectively secured to one another for improved sealing.

DETAILED DESCRIPTION

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

This application is related to and claims the benefit of the priority date of U.S. Provisional Application Ser. No. 61/613, 136, filed on Mar. 20, 2012. The entirety of that application is hereby incorporated by reference for all purposes.

The present teachings provide for improved mechanical attachment between one or more dissimilar materials in formation of a baffle assembly. The baffle assembly disclosed herein may include a carrier bonded to a resinous material and one or more separately attached or integrally formed fasteners for securing the sealing assembly within a cavity. The carrier may include an inner portion having a first outward facing surface and at least one sloping channels defined in and recessed relative to the first surface. The carrier may also include at least one finger member that is located within in the inner portion and projects outwardly from within at least one of the sloping channels. The carrier may include a peripheral portion that generally surrounds the inner portion and includes at least one outwardly projecting ledge such that the inner portion and the peripheral portion are connected along at least one barrier wall that at least partially circumscribes the inner portion and which intersects with at least one of the sloping channels.

The baffle assembly includes a carrier, which may have a substantially consistent and planar surface topography, or may include a variable surface topography which may include one or more raised and/or lowered portions. The carrier may be formed of a first material and is generally contacted with a second material that may be dissimilar from the first material that forms the carrier. The carrier may have an inner surface which may have a first outwardly facing surface and a second outwardly facing surface that generally opposes the first outwardly facing surface. The inner surface may be at least partially surrounded by a peripheral portion. The second material (e.g., the dissimilar material) may be located onto the carrier such that it contacts one or more of the inner surface and the peripheral portion. In an effort to avoid the risk of detachment from the carrier, the second material may be located onto both the peripheral portion and the inner portion.

The inner portion may include one or more features to securely engage the second material. Such features may include one or more channels formed onto the inner portion. The channels may be located in a recessed relationship with the surface of the inner portion. The channels may be of a consistent depth along the carrier or may be of a variable depth. The channels may include a sloping depth, such that the depth of the channels decreases as the channels approach the peripheral portion. Each channel may be formed having a similar depth cross-section. Alternatively, different channels may have differing depth cross-sections. The depth of the channels may range from about 0.001 mm to about 10 mm. The depth of the channels may range from about 0.01 mm to about 3 mm. The depth of the channels at the deepest point may be from about 1 mm to about 5 mm.

The channels may extend from the peripheral portion to a central portion of the carrier, such that the channels extend across an entire diameter of the carrier. Alternatively, the channels may only extend across a portion of the carrier. As an example, the channels may extend inward from the peripheral portion. The channels may extend inward less than about 20 mm, less than about 10 mm, or even less than about 5 mm. The channels may extend from a central portion of the carrier and may only extend less than about 20 mm, less than about 10 mm, or even less than about 5 mm.

In addition to the channels, the carrier may also include one or more members for further securing the second material to the carrier. The members may be located within the channels, separate from the channels, or both. The members may be formed in any configuration for maximizing contact with the second material. As an example, the surface area of the member may be increased so that the area of contact between the member and the second material is maximized. As an example, the member may be formed a finger member which may be a flag, a pin, a post, a hook, a fin, or any other extension that can receive and engage the second material. As another example, the flow of the second material over the member may cause a portion of the member to be bent or folded so that the area of contact between the member and the second material is maximized. The member may deflect during and in response to flow of molten expandable material. The member may become elastically or plastically deformed by the flow of the expandable material. It may thus resist return to its initial molded shape before the expandable material hardens to its green state (an uncured, yet hardened state). The member or at least a portion of the member may be integrally formed with the carrier. Alternatively, the member may be separately formed from the carrier. It may be possible to locate one or more of the members on an outer portion of the part (e.g., on a ledge that is external of the inner portion).

As referenced above, the carrier may include a peripheral portion that surrounds the inner portion of the carrier. The second material may thus also be located along the peripheral edge. More specifically, the peripheral portion may include an outwardly projecting ledge and the second material may be located onto the outwardly projecting ledge. The second material may be located in a non-continuous manner along the outwardly projecting ledge. The second material may be located in a continuous band along the outwardly projecting ledge. The peripheral portion may be connected to the inner portion along a barrier wall which may extend substantially around the inner portion or may extend only partially around the inner portion. One or more of the peripheral portion, the outwardly projecting ledge and the barrier wall may be free of any additional extensions (e.g., members).

A fastening device may be included that is integrally formed with the carrier or separately formed from the carrier. The fastening device may extend from the peripheral portion. The fastening device may be located in a different plane than the inner portion of the carrier or may be located in the same plane as the inner portion of the carrier. The fastening device may be offset of the plane of the inner portion. The fastening device may extend substantially parallel to the inner portion of the carrier or may extend substantially perpendicular to the inner portion of the carrier. The fastening device may extend at a skew angle relative to the inner portion of the carrier. The fastening device may include an arrowhead fastener, a tree-fastener, a clip, a hook or the like. The fastening device may include an opening for receiving an extension from within a cavity into which the baffle assembly is located. The fastening device may be provided as a magnetic material or an adhesive material that can attach (e.g., adhere or magnetically secure) the baffle assembly to a cavity. In such an embodiment, the magnetic material or the adhesive material may be interspersed within the carrier or the second material. Alternatively, the magnetic material or the adhesive material may be disposed upon the carrier and/or the second material or may be otherwise connected to the carrier and/or the second material.

The baffle assembly may be substantially free of any structure on the carrier for preventing flow of the second material onto the inner portion of the carrier. Certain portions of the carrier may be substantially free of any structure for securing the second material to the carrier. As an example, the peripheral portion may be substantially free of any structural members for securing the second material to the carrier. The outwardly projecting ledge may be substantially free of any structural member for securing the second material to the carrier. The barrier wall may be substantially free of any structural member for securing the second material to the carrier.

Formation of the materials of the present teachings may include a variety of processing steps depending on the desired configuration of the materials. Various processes such as molding (e.g., compression, injection or other molding), extrusion or the like may be used to form the carrier material and the second material. The carrier and second material may be formed from a multi-shot injection molding process. More specifically, by forming the structures for securing the second material onto the carrier (e.g., the channels and the finger members) on the inner portion of the carrier, the molding process is simplified because no lifters are necessary for removing the resulting baffle assembly from the mold.

The size and shape of the baffle assembly may depend upon the desired location of the device within a cavity. The perimeter of the baffle assembly may be shaped so that it fits within and conforms to a cross-section of a cavity. The baffle assembly may be shaped so that in the event that the second material is an expandable material, the expandable material expands directly into areas that are traditionally difficult to access (e.g., small areas within a cavity that are difficult to seal due to the size and shape of the area). The second material may be located onto the inner portion so that the second material can be activated to expand over and onto the inner portion. The second material may be located onto the peripheral portion so that the second material can be activated to expand beyond the outwardly projecting ledge to reach areas of the cavity that may not be directly contacted by the carrier. The baffle assembly may be located within a cavity with one or more fasteners so that the perimeter of the baffle assembly does not contact the cavity wall prior to expansion of the second material.

The baffle assembly may include one or more openings along the inner portion of the carrier. The openings may be present so as to reduce the amount of material required to effectively seal a cavity, thereby reducing the weight of the device. The second material may expand to cover the one or more openings. Alternatively, the baffle assembly may include edges, slots, or attachments that guide the expansion of the second material and thus prevent the second material from covering the one or more openings. The one or more openings may be present so that fluid (e.g., e-coat fluid) can drain from one side of the baffle assembly to the other prior to expansion of the second material. The one or more openings may allow for devices or materials within a cavity to pass from one side of the baffle assembly to another side of the baffle assembly before or after expansion of the second material. As an example, the one or more openings may allow for drain tube passage. The one or more openings may also provide access points within a cavity for welding purposes.

The carrier may comprise a rigid polymeric material. The carrier may comprise a flat metal sheet. The carrier may also include a mesh material. The carrier may include a variety of other materials such as polymers, elastomers, fibrous materials (e.g., cloth or woven materials), thermoplastics, plastics, nylon, and combinations thereof. The carrier may be flexible to allow for bending of the baffle assembly to fit within desired small spaces of a cavity.

After placement of the baffle assembly into a cavity, the second material may be an activatable material that expands according to a predetermined set of conditions. For example, exposure to certain levels of heat may cause the second material to expand. The volumetric expansion of the second material may vary depending upon the sealing and/or baffling needs of a particular cavity. The second material may expand at least about 100%. The second material may expand less than about 2000%. The second material may expand at least about 500%, at least about 1000%, or more. The second material may expand less than about 1000% or even less than about 500%.

The second material may be a resinous generally dry to the touch or tacky and may be shaped in any form of desired pattern, placement, or thickness, but is preferably of substantially uniform thickness. Though other heat-activated materials are possible for the second material, a preferred heat activated material is an expandable polymer or plastic, and preferably one that is foamable. The second material may be a relatively high expansion foam having a polymeric formulation that includes one or more of an epoxy resin, an acetate (e.g. ethylene vinyl acetate), a thermoplastic polyether, an acrylate and/or a methacrylate (e.g., a copolymer of butyl acrylate and methyl acrylate), an epoxy/elastomer adduct, and one or more fillers (e.g., a clay filler, and/or a nanoparticle-containing filler). Preferred thermally expandable materials are disclosed in U.S. Pat. Nos. 7,313,865; 7,125,461; and 7,199,165 incorporated by reference herein for all purposes. For example, and without limitation, the foam may also be an EVA/rubber based material, including an ethylene copolymer or terpolymer that may possess an alpha-olefin. As a copolymer or terpolymer, the polymer is composed of two or three different monomers, i.e., small molecules with high chemical reactivity that are capable of linking up with similar molecules. Suitable expandable materials include those available from L&L Products, Inc. under the designations L7220, L2821, L1066, L205, L2010, L2105, L2108A, L2806, L2811, L4200, L4141, L4161, L4315, L5510, L5520, L5540, L5600, L5601, L7102, and L7104.

The expandable material can be formed of other materials provided that the material selected is heat-activated or otherwise activated by an ambient condition (e.g. moisture, pressure, time or the like) and cures under appropriate conditions for the selected application. One such material is the epoxy based resin disclosed in U.S. Pat. No. 6,131,897, the teachings of which are incorporated herein by reference. Some other possible materials include, but are not limited to, polyolefin materials, copolymers and terpolymers with at least one monomer type an alpha-olefin, phenol/formaldehyde materials, phenoxy materials, and polyurethane materials with high glass transition temperatures. Additional materials may also be used such as those disclosed in U.S. Pat. Nos. 5,766,719; 5,755,486; 5,575,526; and 5,932,680, incorporated by reference herein for all purposes.

In applications where the expandable material is a heat activated material, an important consideration involved with the selection and formulation of the material is the temperature at which a material cures and, if expandable, the temperature of expansion. Typically, the material becomes reactive (cures, expands or both) at higher processing temperatures, such as those encountered in an automobile assembly plant, when the material is processed along with the automobile structures at elevated temperatures or at higher applied energy levels, e.g., during coating (e.g., e-coat, paint or clearcoat) curing steps. While temperatures encountered in an automobile assembly operation may be in the range of about 148.89° C. to 204.44° C. (about 300° F. to 400° F.) for body shop applications (e.g., e-coat) and, for paint shop applications, are commonly about 93.33° C. (about 200° F.) or slightly higher (e.g., 120° C.-150° C.).

The baffle assembly of the present teachings may be installed into an automotive vehicle although it may be employed for other articles of manufacture such as boats, buildings, furniture, storage containers or the like. The baffle assembly may be used to seal and/or baffle a variety of components of an automotive vehicle including, without limitation, body components (e.g., panels), frame components (e.g., hydroformed tubes), pillar structures (e.g., A, B, C or D-pillars), bumpers, roofs, bulkheads, instrument panels, wheel wells, floor pans, door beams, hem flanges, vehicle beltline applications, doors, door sills, rockers, decklids, hoods or the like of the automotive vehicle.

Figure 1:
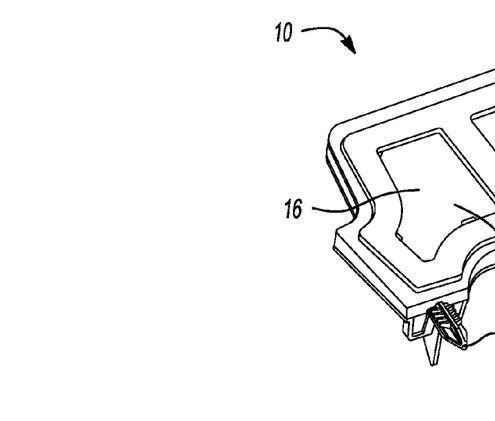
FIG. 1 shows a perspective view of an illustrative example of the baffle assembly of the present teachings.
Figure 2:
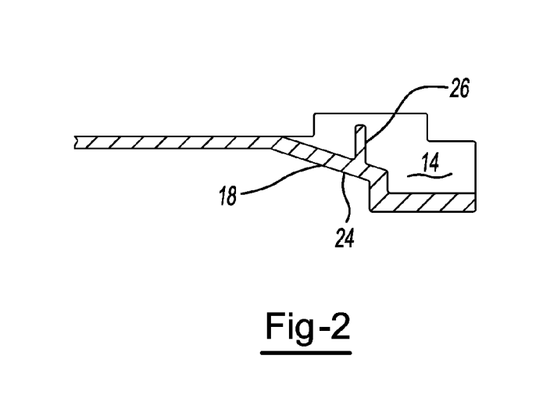
FIG. 2 shows a cross-sectional view of the baffle assembly shown at FIG. 1.

FIG. 1 shows the baffle assembly 10 having a carrier 12 and including a resinous material layer 14 located thereon. The carrier 12 includes an inner portion 16 having a first outwardly facing surface 18. The carrier 12 is shown having an integrated fastener 20 formed along the peripheral portion 22. As shown in FIG. 2, the first outwardly facing surface 18 includes a sloping channel 24 recessed within the first outwardly facing surface. The sloping channel 24 is shown having a finger member 26 located within the channel for engaging the resinous material 14 located within the channel.

Figure 3A:
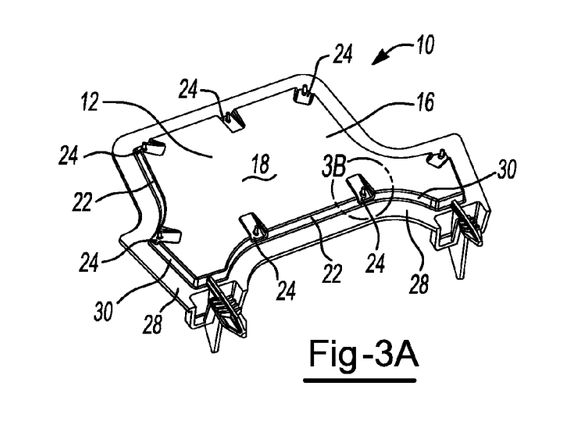
FIG. 3A shows a perspective view of the baffle assembly of FIG. 1 prior to the molding of any resinous material onto the carrier.

FIG. 3A depicts a carrier 12 of an exemplary baffle assembly 10 prior to forming any secondary dissimilar material onto the carrier. As shown, the carrier 12 may include a plurality of sloping channels 24 located into the inner portion 16 of the carrier. The sloping channels 24 may be recessed within the first outwardly facing surface 18 of the carrier. The carrier of FIG. 3A further depicts the peripheral portion 22 generally surrounding the inner portion 16 and having an outwardly projecting ledge 28. The inner portion 16 and the peripheral portion 22 are shown connected along a barrier wall 30 that at least partially circumscribes the inner portion and which intersects with each of the sloping channels 24.

Figure 3B:
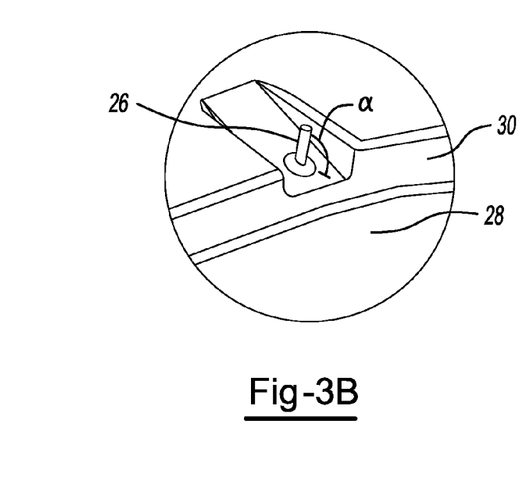
FIG. 3B shows a magnified view of the baffle assembly of FIG. 3A.

At FIG. 3B, an exemplary sloping channel 24 is shown. The sloping channel 24 intersects the barrier wall 30. A finger member 26 is located within the slopping channel 24 and the finger member extends from the sloping channel at an angle α that is about 90° relative to the outwardly projecting ledge 28. The finger member 26 and slopping channel 24 act to engage and mechanically attach the resinous material (not shown) to the baffle assembly.

Figure 4:
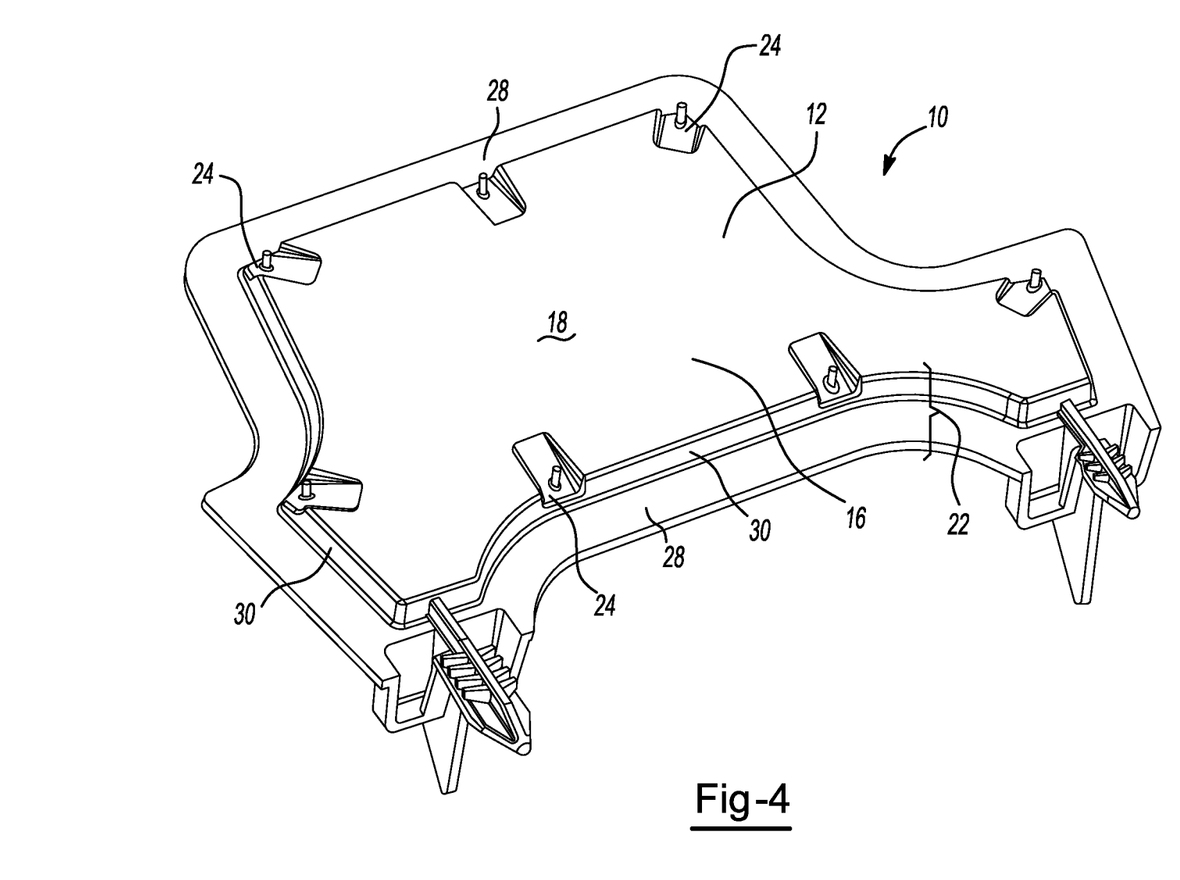
FIG. 4 shows a perspective view of the baffle assembly of FIG. 3A.

FIG. 4 depicts the baffle assembly 10 having a carrier 12, shown prior to the attachment of the resinous material. The carrier 10 includes an inner portion 16 having a first outwardly facing surface 18. A peripheral portion 22 substantially surrounds the inner portion 16. The peripheral portion 22 includes an outwardly projecting ledge 28. The inner portion 16 and peripheral portion 22 are connected along a barrier wall 30. The inner portion 16 includes sloping channels 24 located thereon, which are shown recessed within the inner portion 16 for receiving the resinous material (not shown).

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the Detailed Description of the Invention of a range in terms of at "'x' parts by weight of the resulting polymeric blend composition" also contemplates a teaching of ranges of same recited amount of "x" in percent by weight of the resulting polymeric blend composition."

Unless otherwise stated, ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. By use of the term "may" herein, it is intended that any described attributes that "may" be included are optional.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

The invention claimed is:

1. A baffle assembly comprising:
   i. a carrier including:
      a. an inner portion that includes a first outward facing surface and at least one sloping channel defined in and recessed relative to the first surface;
      b. a peripheral portion that generally surrounds the inner portion and includes at least one outwardly projecting ledge, the inner portion and the peripheral portion being connected along at least one barrier wall that at least partially circumscribes the inner portion and which intersects with at least one of the sloping channels;
      c. at least one finger member that is located within in the inner portion and projects outwardly from within at least one of the sloping channels at an angle between 0 and 180° relative to the outwardly projecting ledge;
   ii. a resinous material that includes a polymer that (i) is adapted for thermal expansion upon activation by heat that is located within at least one sloping channels, (ii) is located on at least a portion of the outwardly projecting ledge; and (iii) at least partially covers the at least one finger member and (iv) is retained on the carrier at least partially due to a mechanical connection with the at least one finger member.

2. The baffle assembly of claim 1, wherein the first surface of the inner portion is generally flat.

3. The baffle assembly of claim 1, wherein the outwardly projecting ledge only partially circumscribes the at least one barrier wall.

4. The baffle assembly of claim 1, wherein the at least one finger member is oriented at an angle of approximately 90 relative to the first outward facing surface.

5. The baffle assembly of claim 1, wherein the at least one finger is configured as an elongated structure that deforms upon flow of the resinous material.

6. The baffle assembly of claim 1, wherein the at least one finger member projects from a wall defining the sloping channel outwardly in a direction toward the first surface.

7. The baffle assembly of claim 1, wherein the at least one finger member has a hook shaped free end portion.

8. The baffle assembly of claim 1, wherein the resinous material includes a plurality of masses that are located on the outwardly projecting ledge and are intermittently spaced relative to each other.

9. The baffle assembly of claim 1, wherein the resinous material is such that it can be melted for injection molding at a first temperature, and thereafter be activated by heating at an activation temperature above the first temperature for causing it to expand.

10. The baffle assembly of claim 1, wherein the carrier includes an integrated mechanical attachment device that projects away from the inner portion and is substantially juxtaposed with either or both of the inner portion or at least one of the sloping channels so that the attachment device can be located within a hole of a wall defining a cavity of a transportation vehicle, and the resinous material will be in opposing relation to the hole for filling the hole upon activation of the resinous material by exposure to a temperature above its activation temperature.

11. A baffle assembly for use in a cavity of a transportation vehicle, comprising:
   i. a carrier including:
      a. an inner portion that includes a first outward facing surface that is generally flat and at least one sloping channel defined in and recessed relative to the first surface;
      b. a peripheral portion that generally surrounds the inner portion and includes at least one outwardly projecting ledge, the inner portion and the peripheral portion being connected along at least one barrier wall that at least partially circumscribes the inner portion and which intersects with at least one of the sloping channels;
      c. at least one finger member formed as an elongated structure that is located within in the inner portion and projects outwardly from within at least one of the sloping channels at an angle of approximately 90° relative to the first outward facing surface;
   ii. a resinous material that includes a polymer that (i) is adapted for thermal expansion upon activation by heat that is located within at least one sloping channels, (ii) is located on at least a portion of the outwardly projecting ledge; and (iii) at least partially covers the at least one finger member and (iv) is retained on the carrier at least partially due to a mechanical connection with the at least one finger member such that the resinous material deforms the finger member upon flowing of the resinous material at activation.

12. The baffle assembly of claim 11 including more than two sloping channels.

13. The baffle assembly of claim 11 including more than one finger member in the at least one sloping channel.

14. The baffle assembly of claim 1 wherein at least a portion of the resinous material is located in direct planar contact with the first outward facing surface in portions of the first outward facing surface other than the at least one sloping channel.

15. The baffle assembly of claim 11, wherein the at least one finger member has a hook shaped free end portion.

16. The baffle assembly of claim 11 including one or more fasteners extending outwardly from the carrier for attaching the carrier to a cavity wall.

17. The baffle assembly of claim 11, wherein the resinous material is such that it can be melted for injection molding at a first temperature, and thereafter be activated by heating at an activation temperature above the first temperature for causing it to expand.

18. The baffle assembly of claim 11, wherein a bottom of each sloping channel sits above the outwardly projecting ledge.

* * * * *

UNITED STATES PATENT AND TRADEMARK OFFICE
CERTIFICATE OF CORRECTION

| | | |
|---|---|---|
| PATENT NO. | : 8,967,327 B2 | Page 1 of 1 |
| APPLICATION NO. | : 13/796250 | |
| DATED | : March 3, 2015 | |
| INVENTOR(S) | : Blake Synnestvedt | |

It is certified that error appears in the above-identified patent and that said Letters Patent is hereby corrected as shown below:

In the Claims

Column 10, Line 5, Claim 4, please add "°" after 90

Signed and Sealed this
Twenty-third Day of June, 2015

Michelle K. Lee
*Director of the United States Patent and Trademark Office*